United States Patent
Chen et al.

(10) Patent No.: US 8,363,033 B2
(45) Date of Patent: Jan. 29, 2013

(54) CAPACITANCE SENSING CIRCUIT

(75) Inventors: Ke-Horng Chen, Taipei County (TW);
Shih-Wei Wang, Hualien (TW);
Chi-Lin Chen, Taipei County (TW);
Chih-Chung Chen, Taichung County (TW); Chia-Lin Liu, Taichung County (TW); Huai-An Li, Taoyuan County (TW); Chi-Neng Mo, Taoyuan County (TW)

(73) Assignee: Chunghwa Picture Tubes, Ltd., Bade City, Taoyuan (TW)

( * ) Notice: Subject to any disclaimer, the term of this patent is extended or adjusted under 35 U.S.C. 154(b) by 485 days.

(21) Appl. No.: 12/814,497

(22) Filed: Jun. 14, 2010

(65) Prior Publication Data
US 2011/0216031 A1 Sep. 8, 2011

(30) Foreign Application Priority Data

Mar. 8, 2010 (TW) .............................. 99106596 A (51) Int. Cl.
*G06F 3/045* (2006.01)
(52) U.S. Cl. ..................................... 345/174; 178/18.06
(58) Field of Classification Search .......... 345/173–178, 345/691; 178/18.01–18.07, 20.01–20.04
See application file for complete search history.

(56) References Cited

U.S. PATENT DOCUMENTS

| | | | | |
|---|---|---|---|---|
| 5,495,077 A | * | 2/1996 | Miller et al. | 178/18.06 |
| 5,510,813 A | * | 4/1996 | Makinwa et al. | 345/173 |
| 5,528,266 A | * | 6/1996 | Arbeitman et al. | 345/173 |
| 5,777,596 A | | 7/1998 | Herbert | |

FOREIGN PATENT DOCUMENTS

TW 200813919 3/2008

* cited by examiner

*Primary Examiner* — Vijay Shankar
(74) *Attorney, Agent, or Firm* — Winston Hsu; Scott Margo (57) ABSTRACT

A capacitance sensing circuit for a touch panel includes an analog capacitance-detecting circuit, a PWM-to-digital circuit and a self-calibration circuit. The analog capacitance-detecting circuit detects the capacitance of the touch panel based on a charging current, and converts the detected capacitance into a PWM control signal. The PWM-to-digital circuit converts the PWM control signal into a sensing count value based on a clock signal. The self-calibration circuit adjusts the value of the charging current or the frequency of the clock signal according to the difference between the range of the sensing count value and a predetermined detecting range. The predetermined detecting range can thus be adjusted for matching the range of the sensing count value.

9 Claims, 12 Drawing Sheets

CAPACITANCE SENSING CIRCUIT

BACKGROUND OF THE INVENTION

1. Field of the Invention

The present invention is related to a capacitance sensing circuit, and more particularly, to a capacitance sensing circuit with adaptive detecting range for use in a touch panel.

2. Description of the Prior Art

Liquid crystal display (LCD) devices with thin appearance have gradually replace traditional bulky cathode ray tube (CRT) displays and been widely used in various electronic products. With rapid shrinkage in size, there is less room for traditional input devices such as keyboards or mice. Therefore, touch panels providing tactile inputs and display function have become more and more popular. There are various types of touch panels, such as resistive, capacitive, surface acoustic or infrared. Among those, capacitive touch panels detect capacitance variations corresponding to changes in static electricity caused by tactile inputs from a human finger or a stylus, thereby capable of determining the actual location of the touch action.

In a traditional capacitance sensing circuit, an analog capacitance-detecting circuit is normally adopted for detecting a measured capacitance $C_{SENSE}$ of a panel, based on which a corresponding digital signal is calculated using a counter. The measured capacitance $C_{SENSE}$ includes a stray capacitance $C_{PANEL}$ which is inherently present in the panel and a touch capacitance $C_{FINGER}$ which is present due to a touch action. Since panel size normally increases with resolution, the inherent stray capacitance $C_{PANEL}$ also increases accordingly. When a finger is in contact with the panel, the increase in the touch capacitance $C_{FINGER}$ is insignificant compared to the stray capacitance $C_{PANEL}$ of the entire panel ($C_{PANEL} \gg C_{FINGER}$). While the capacitance variations due to other noises are also much larger than that in the touch capacitance $C_{FINGER}$, the prior art capacitance sensing circuit may not be able to provide accurate capacitance measurement. On the other hand, the capacitance input range is normally set within the optimized linear region of the capacitance sensing circuit. However, the prior art capacitance sensing circuit may operate in the non-linear region if the capacitance input range varies with humidity, temperature, operational environment, process or device aging, which largely reduces image resolution.

SUMMARY OF THE INVENTION

In order to overcome the disadvantages of the prior art, the present invention provides a capacitance sensing circuit with adaptive detecting range. The capacitance sensing circuit includes an analog capacitance-detecting circuit configured to detect a touch capacitance of a touch panel when a touch action occurs according to a charging current and convert a detected value of the touch capacitance into a PWM control signal; a PWM-to-digital circuit configured to convert the PWM control signal into a sensing count value according to a clock signal; and a self-calibration counter configured to adjust the charging current or the clock signal according to a difference between the sensing count value and a predetermined detecting range, thereby adjusting the predetermined detecting range for matching a range of the sensing count value.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
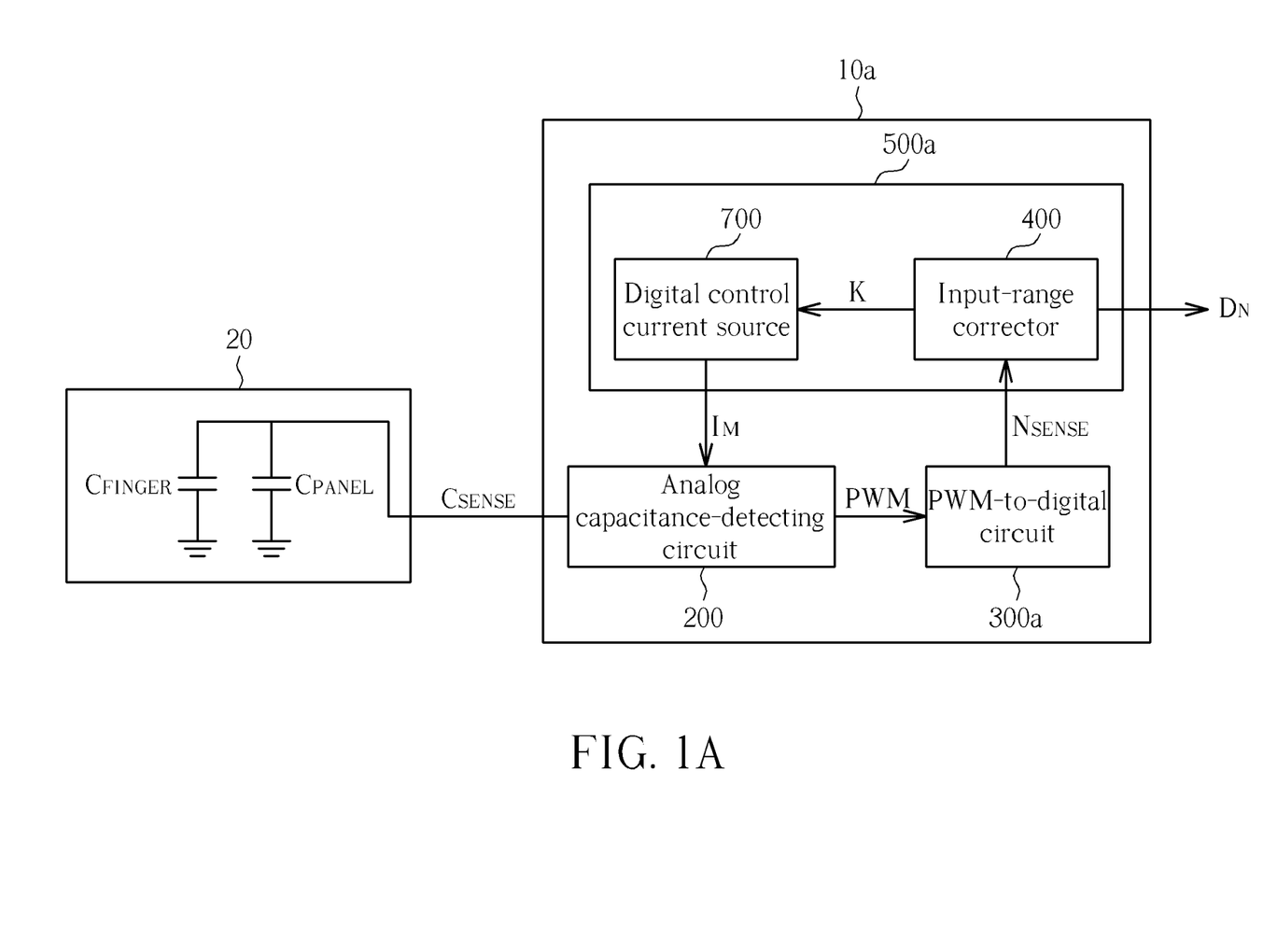
FIGS. 1A and 1B are diagrams illustrating capacitance sensing circuits according to the present invention.
Figure 1B:
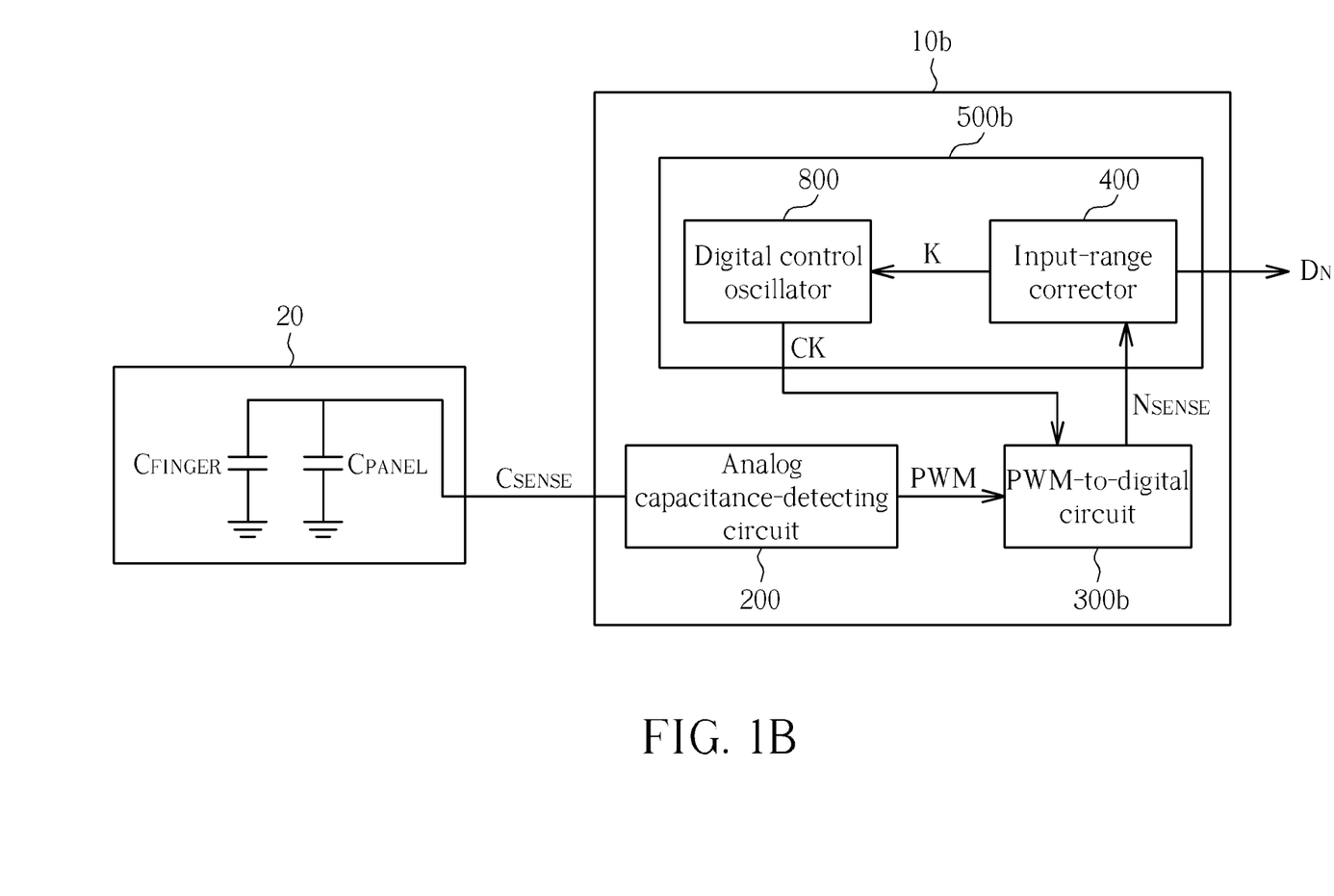

FIG. 1A is a capacitance sensing circuit 10a according to a first embodiment of the present invention, and FIG. 1B is a capacitance sensing circuit 10b according to a second embodiment of the present invention. The capacitance sensing circuit 10a includes an analog capacitance-detecting circuit 200, a PWM (pulse width modulation)-to-digital circuit 300a, and a self-calibration counter 500a. The capacitance sensing circuit 10b includes an analog capacitance-detecting circuit 200, a PWM-to-digital circuit 300b, and a self-calibration counter 500b. The capacitance sensing circuits 10a and 10b are configured to detect a measured capacitance $C_{SENSE}$ of a touch panel 20 and convert the detected capacitance into a PWM control signal. As previously stated, the measured capacitance $C_{SENSE}$ includes the inherent stray capacitance $C_{PANEL}$ of the panel 20 and the touch capacitance $C_{FINGER}$ due to touch actions. The PWM-to-digital circuits 300a and 300b are configured to convert the PWM control signal into a digital sensing count value $N_{SENSE}$. The structures and operations of theses devices will be described in more detail in subsequent paragraphs.

In the capacitance sensing circuit 10a according to the first embodiment of the present invention, the self-calibration counter 500a includes an input-range calibrator 400 and a digital control current source 700. The input-range calibrator 400 is configured to output a digital signal $D_N$ associated with touch actions to a back-end circuit (such as a digital signal processor). Meanwhile, the capacitance sensing circuit 10a is also configured to store and determine a capacitance-detecting range, based on which a range conversion ratio K is then generated for adjusting a charging current $I_M$ outputted by the digital control current source 700. The capacitance-detecting range may thus be optimized by adjusting the length of the overall pulse width.

In the capacitance sensing circuit 10b according to the second embodiment of the present invention, the self-calibration counter 500b includes an input-range calibrator 400 and a digital control oscillator 800. The input-range calibrator 400 is configured to output a digital signal $D_N$ associated with touch actions to a back-end circuit (such as a digital signal processor). Meanwhile, the capacitance sensing circuit 10b is also configured to store and determine a capacitance-detecting range, based on which a clock signal CK of the digital control oscillator 800 is adjusted. The capacitance-detecting range may thus be optimized by adjusting the overall sampling clock.

Figure 2:
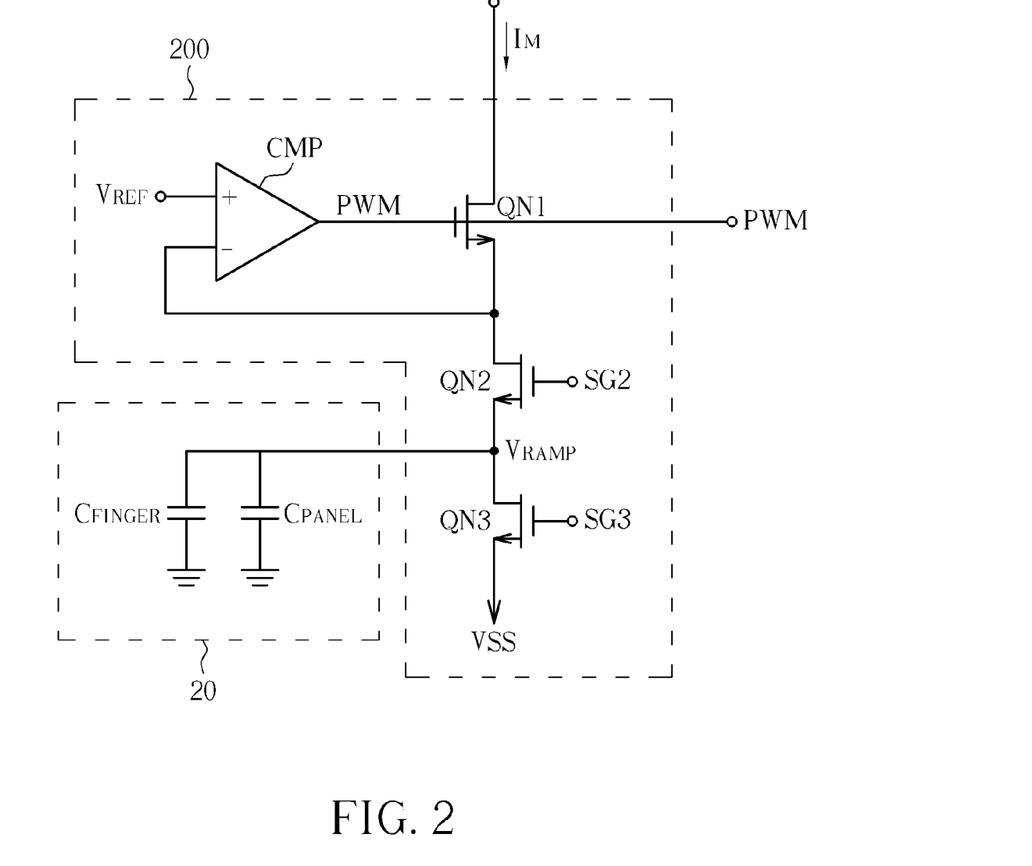
FIG. 2 is a diagram illustrating an analog capacitance-detecting circuit according to the present invention.

FIG. 2 is a diagram of an illustrated embodiment of the analog capacitance-detecting circuit 200 according to the present invention. The analog capacitance-detecting circuit 200 includes switches QN1-QN3 and a comparator CMP. The switch QN1 operates according to the PWM signal, the switch QN2 operates according to a clock signal SG2, and the switch QN3 operates according to a clock signal SG3. The duty cycle of the PWM control signal is determined by a ramp voltage $V_{RAMP}$, and the clock signals SG2 and SG3 have opposite phases. The switches QN1-QN3 may be metal-oxide-semiconductor (MOS) transistor switches or other devices having similar functions. For ease of explanation, N type metal-oxide-semiconductor (NMOS) transistor switches are used for illustration in FIG. 2. The switch QN1 is configured to selectively transmit the charging current $I_M$ received at its first end to its second end according to the PWM signal received at its control end. The switch QN2, having a first end coupled to the second end of the switch QN1 and a second end coupled to the panel 20, is configured to control the charging path of the panel 20 by the charging current $I_M$ according to the clock signal SG2 received at its control end. The switch QN3, having a first end coupled to the panel 20 and a second end coupled to a negative bias voltage VSS, is configured to control the discharging path of the panel 20 according to the clock signal SG3 received at its control end. The comparator CMP includes a first input end for receiving a reference voltage $V_{REF}$, a second input end coupled to the second end of the switch QN1, and an output end coupled to the control end of the switch QN1.

In the capacitance detecting circuit 10a in FIG. 1A, the charging current $I_M$ provided by the digital control current source 700 may be adjustable; in the capacitance detecting circuit 10b in FIG. 1B, the charging current $I_M$ may be provided by a constant current source. When the PWM control signal and the clock signal SG2 are at high level, the charging current $I_M$ is transmitted to the panel 20 via the turned-on switches QN1 and QN2, thereby raising the ramp voltage $V_{RAMP}$. When the ramp voltage $V_{RAMP}$ exceeds a reference voltage $V_{REF}$, the PWM control signal outputted by the comparator CMP switches from high level to low level, thereby turning off the switch QN1. Next, the clock signal SG3 switches to high level, thereby discharging the energy stored in the capacitance of panel 20 to the negative bias voltage VSS via the turned-on switch QN3. With $T_{ON}$ representing the duration in a period during which the PWM control signal is at high level (i.e. the turn-on time of the switch QN1), the charging process of the panel 20 can be illustrated by the following formulae:

$$I_M * T_{ON} = C_{SENSE} * V_{REF} = (C_{FINGER} + C_{PANEL}) * V_{REF}$$

$$T_{ON} = (C_{FINGER} + C_{PANEL})/I_M \quad (1)$$

Figure 3A:
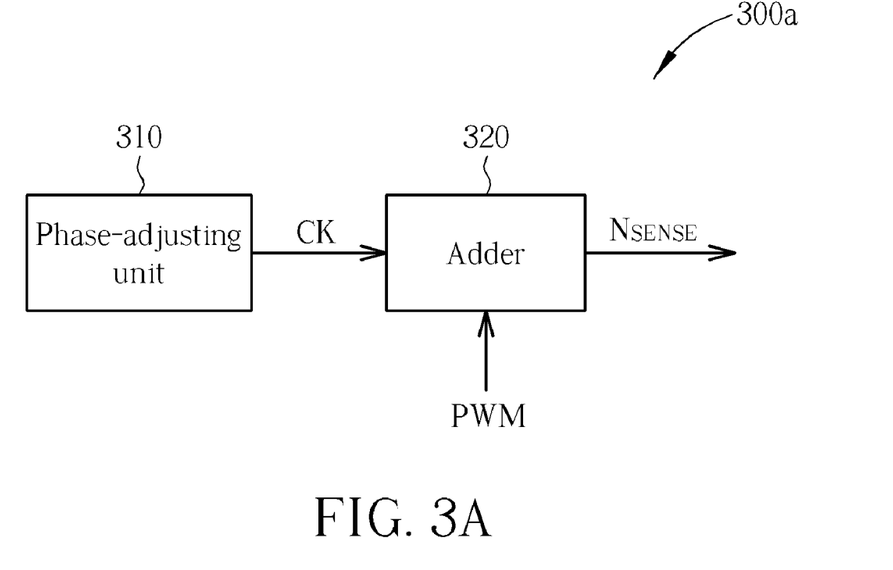
FIGS. 3A and 3B are diagrams illustrating a PWM-to-digital circuit according to the present invention.
Figure 3B:
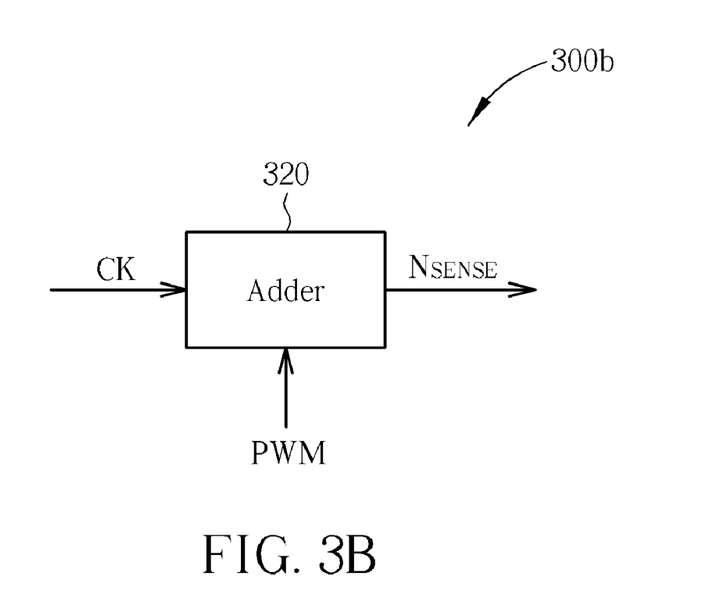

FIG. 3A is a diagram of the PWM-to-digital circuit 300a according to a first embodiment of the present invention. FIG. 3B is a diagram of the PWM-to-digital circuit 300b according to a second embodiment of the present invention. In the first illustrated embodiment, the PWM-to-digital circuit 300a includes a phase adjusting unit 310 and an adder 320. The phase adjusting unit 310 is configured to generate a clock signal CK having a predetermined trigger point and a predetermined frequency $F_{CLK}$. The adder 320 is configured to receive the PWM control signal outputted by the analog capacitance detecting circuit 200 and measure the value of the PWM control signal when triggered by the clock signal CK. If the PWM control signal is at high level, the adder 320 increases its output sensing count value $N_{SENSE}$ by 1. In the second illustrated embodiment, the PWM-to-digital circuit 300b includes an adder 320. The adder 320 is configured to receive the PWM control signal from the analog capacitance-detecting circuit 200 and the clock signal CK from the self-calibration counter 500b, and measure the value of the PWM control signal when triggered by the clock signal CK. If the PWM control signal is at high level, the adder 320 increases its output sensing count value $N_{SENSE}$ by 1.

Figure 4A:
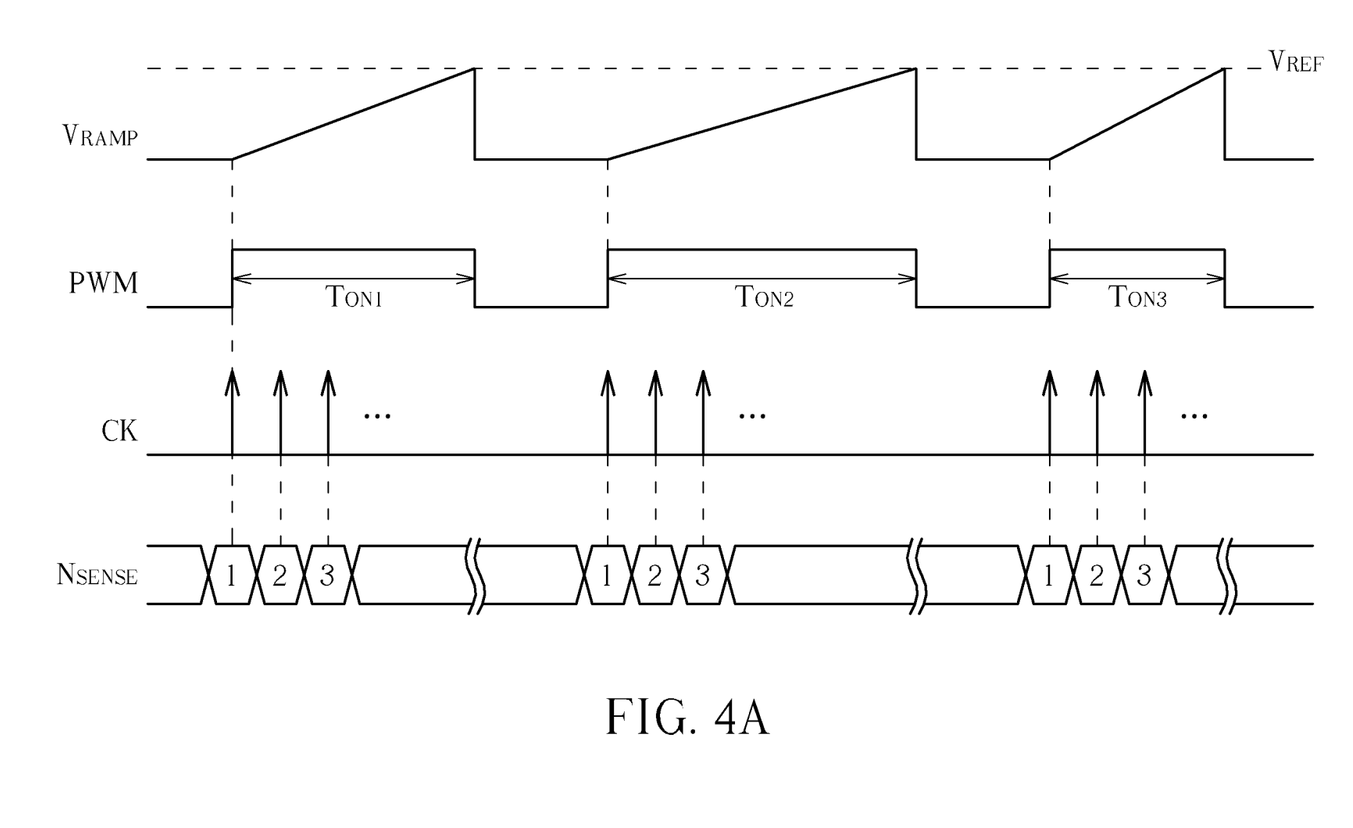
FIGS. 4A and 4B are diagrams illustrating the operations of a PWM-to-digital circuit according to the present invention.
Figure 4B:
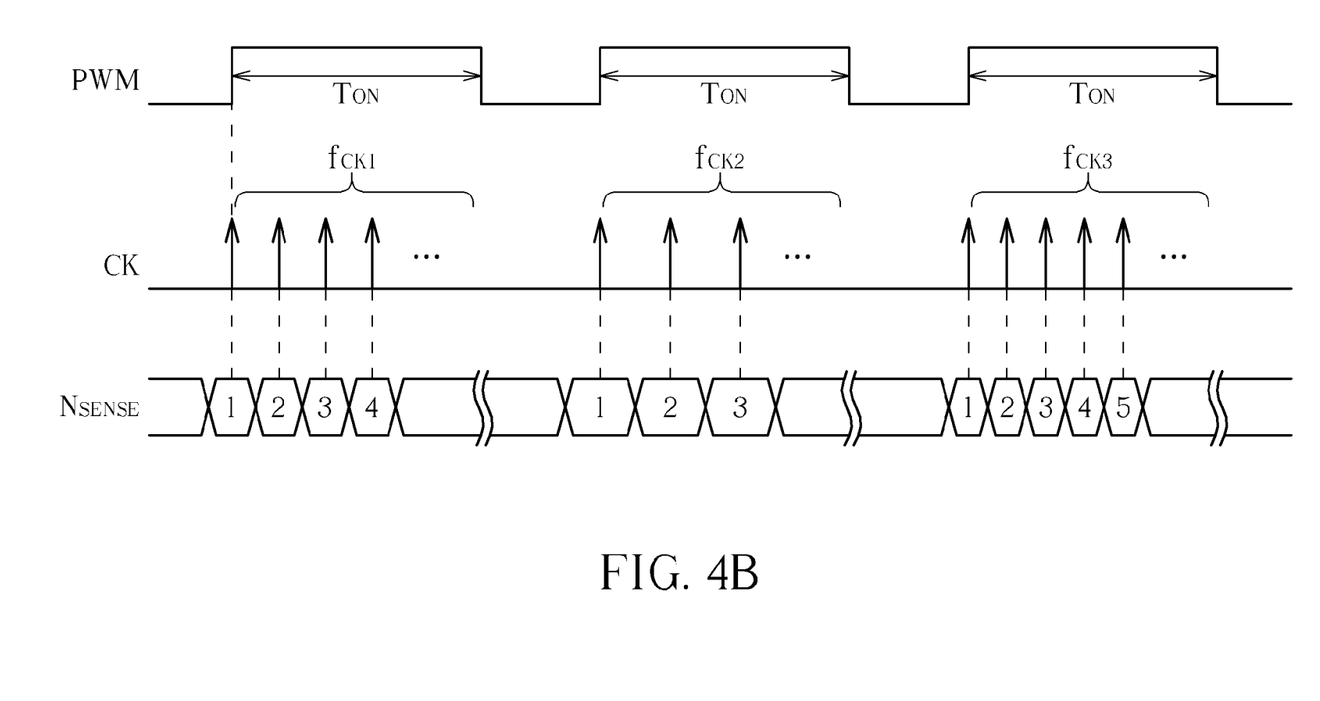

FIG. 4A is a diagram illustrating the operation of the PWM-to-digital circuit 300a according to the first embodiment of the present invention. FIG. 4B is a diagram illustrating the operation of the PWM-to-digital circuit 300b according to the second embodiment of the present invention. FIGS. 4A and 4B show the ramp voltage $V_{RAMP}$, the PWM control signal, the clock signal CK, and the sensing count value $N_{SENSE}$. Since the stray capacitance $C_{PANEL}$ is inherently present in the panel 20, the PWM control signal outputted by the analog capacitance-detecting circuit 200 corresponds to a baseline count value $N_{BASELINE}$ even without the occurrence of a touch action. When a touch action occurs, the PWM control signal outputted by the analog capacitance-detecting circuit 200 corresponds to the sensing count value $N_{SENSE}$. The relationship between the baseline count value $N_{BASELINE}$ and the sensing count value $N_{SENSE}$ are depicted as follows:

$$N_{BASELINE} = \frac{f_{CLK} \times C_{PANEL} \times V_{REF}}{I_M} \quad (2)$$

$$N_{SENSE} = \frac{f_{CLK} \times (C_{FINGER} + C_{PANEL}) \times V_{REF}}{I_M} \quad (3)$$

According to formulae (2) and (3), an actual count value $\Delta N$ associated with the touch action can be obtained as follows:

$$\Delta N = N_{SENSE} - N_{BASELINE} = \frac{f_{CLK} \times C_{FINGER} \times V_{REF}}{I_M} \quad (4)$$

As depicted in formula (1), the counting time during the turn-on time of the switch QN1 in each period (such as $T_{ON}$, $T_{ON1}$-$T_{ON3}$) is determined by whether a touch action occurs and how long the touch action lasts. As depicted in formula (3), the count value $N_{SENSE}$ is inversely proportional to the charging current $I_M$ and directly proportional to the frequency $f_{CLK}$ of the clock signal CK. The present invention adjusts the capacitance-detecting range according to the actual count value $\Delta N$, which will be described in more detail in subsequent paragraphs. In the capacitance sensing circuit 10a according to the first illustrated embodiment, the self-calibration counter 500a changes the counting time $T_{ON1}$-$T_{ON3}$ by regulating the charging current $I_M$, thereby adjusting the capacitance-detecting range as depicted in FIG. 4A; in the capacitance sensing circuit 10b according to the second illustrated embodiment, the self-calibration counter 500b adjusts the period of the clock signal CK so that the frequencies $f_{CLK1}$-$f_{CLK3}$ are different, thereby adjusting the capacitance detecting range as depicted in FIG. 4B.

Figure 5A:
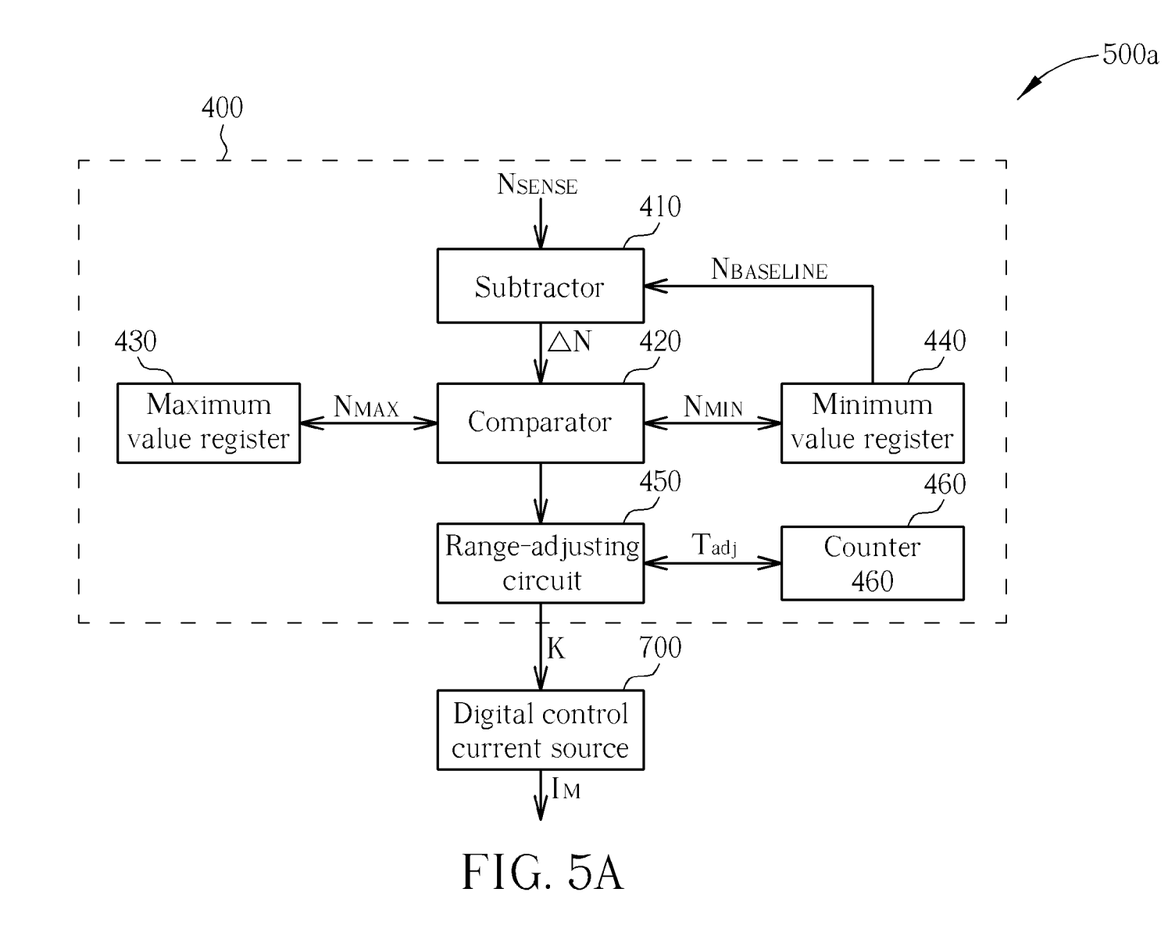
FIGS. 5A and 5B are diagrams illustrating self-calibration counters according to the present invention.
Figure 5B:
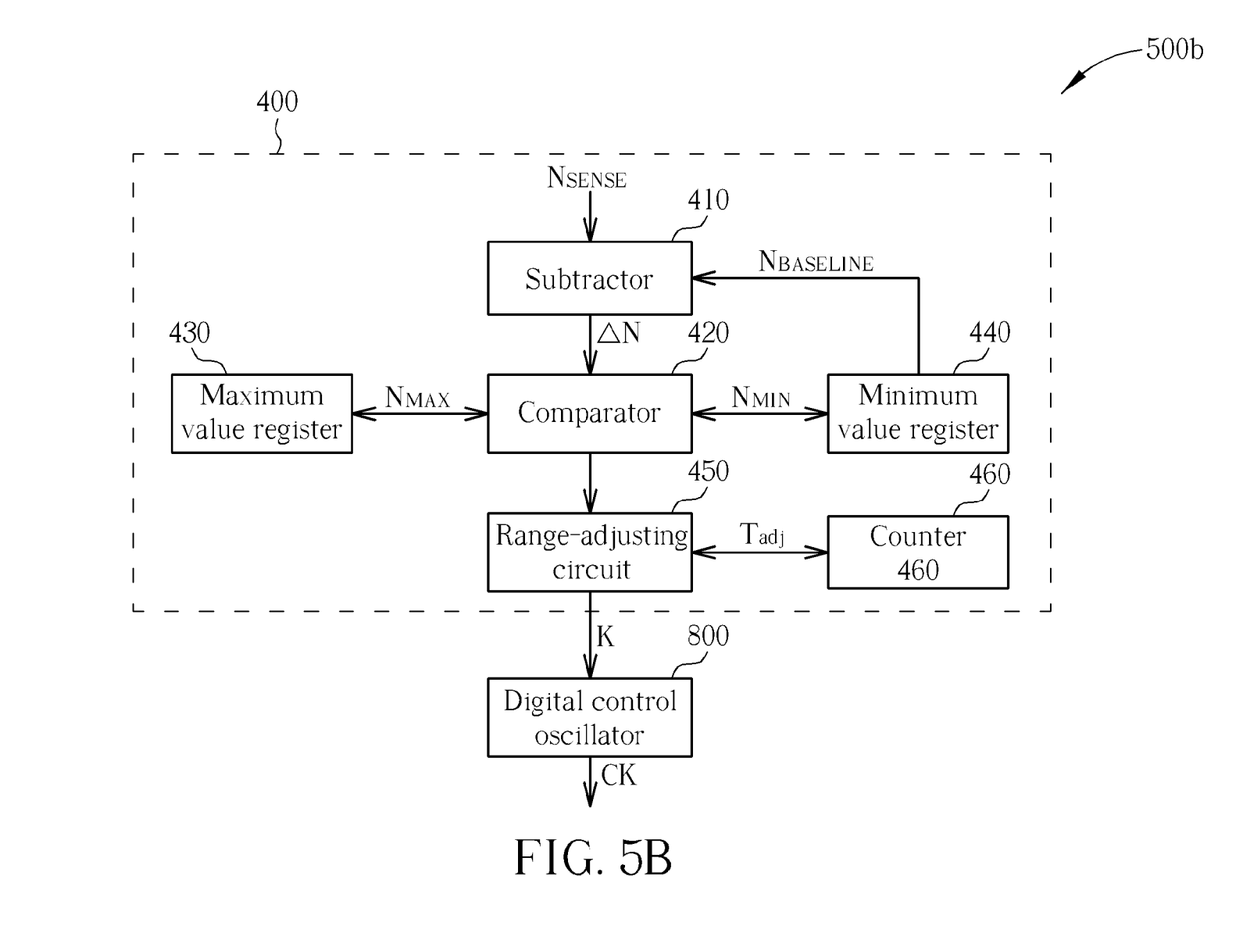

FIG. 5A is a diagram of the self-calibration counter 500a according to the first embodiment of the present invention. FIG. 5B is a diagram of the self-calibration counter 500b according to the second embodiment of the present invention. The input-range calibrators 400 in the self-calibration counters 500a and 500b each include a subtractor 410, a comparator 420, a maximum value register 430, a minimum value register 440, a range-adjusting circuit 450, and a counter 460.

The subtractor 410 is configured to provide the actual count value ΔN associated with a touch action by subtracting the sensing count value $N_{SENSE}$ transmitted from the PWM-to-digital circuit 300a or 300b by the baseline count value $N_{BASELINE}$. The maximum value register 430 is configured to store the maximum count value $N_{MAX}$ which is the largest among all previously stored count values, while the minimum value register 440 is configured to store the minimum count value $N_{MIN}$ which is the smallest among all previously stored count values. The range between the maximum count value $N_{MAX}$ and the minimum count value $N_{MIN}$ represents the current predetermined capacitance-detecting range. The comparator 420 is configured to compare the actual count value ΔN with the maximum count value $N_{MAX}$ previously stored in the maximum value register 430 and with the minimum count value $N_{MIN}$ previously stored in the minimum value register 440: if the range of the actual count value ΔN is substantially equal to the predetermined capacitance-detecting range, the range-adjusting circuit 450 controls the digital control current source 700 or the digital control oscillator 800 according to the current actual count value ΔN; if the range of the actual count value ΔN is larger than the predetermined capacitance-detecting range, the range-adjusting circuit 450 multiplies the actual count value ΔN by a range conversion ratio K (K<1), based on which the charging current $I_M$ of the digital control current source 700 may be increased or the system clock CK of the digital control oscillator 800 may be decreased; if the range of the actual count value ΔN is smaller than the predetermined capacitance-detecting range, the range-adjusting circuit 450 multiplies the actual count value ΔN by a range conversion ratio K (K>1), based on which the charging current $I_M$ of the digital control current source 700 may be decreased or the system clock CK of the digital control oscillator 800 may be increased. Meanwhile, an adjustment period $T_{adj}$ may be set using the counter 460. For example, if the adjustment period $T_{adj}$ is set to 100, the range-adjusting circuit 450 only performs range adjustment each time after receiving 100 actual count values ΔN in order not to vary the capacitance-detecting range too often.

Figure 6A:
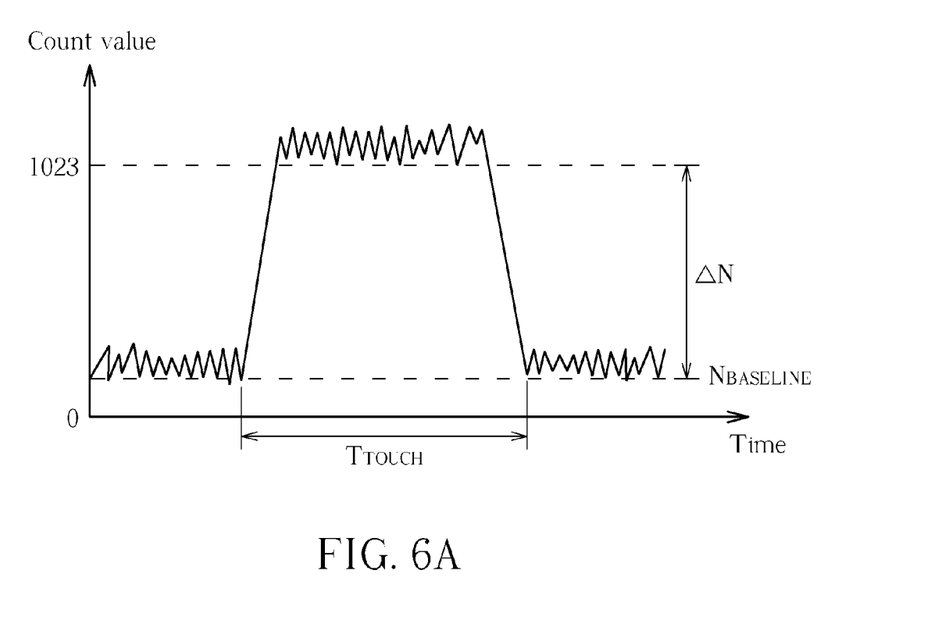
FIGS. 6A-6C are diagrams illustrating the operations of self-calibration counters according to the present invention.
Figure 6B:
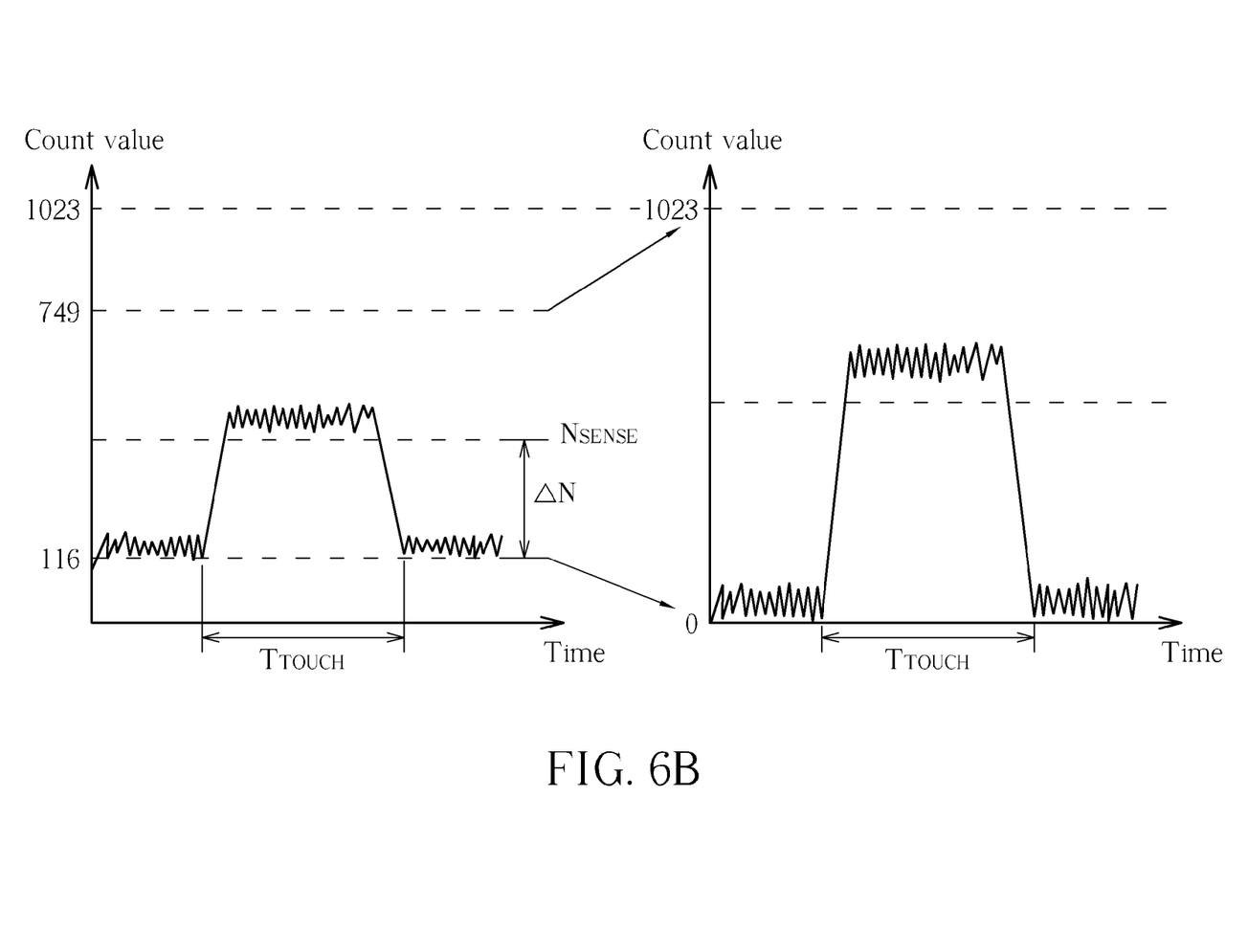
Figure 6C:
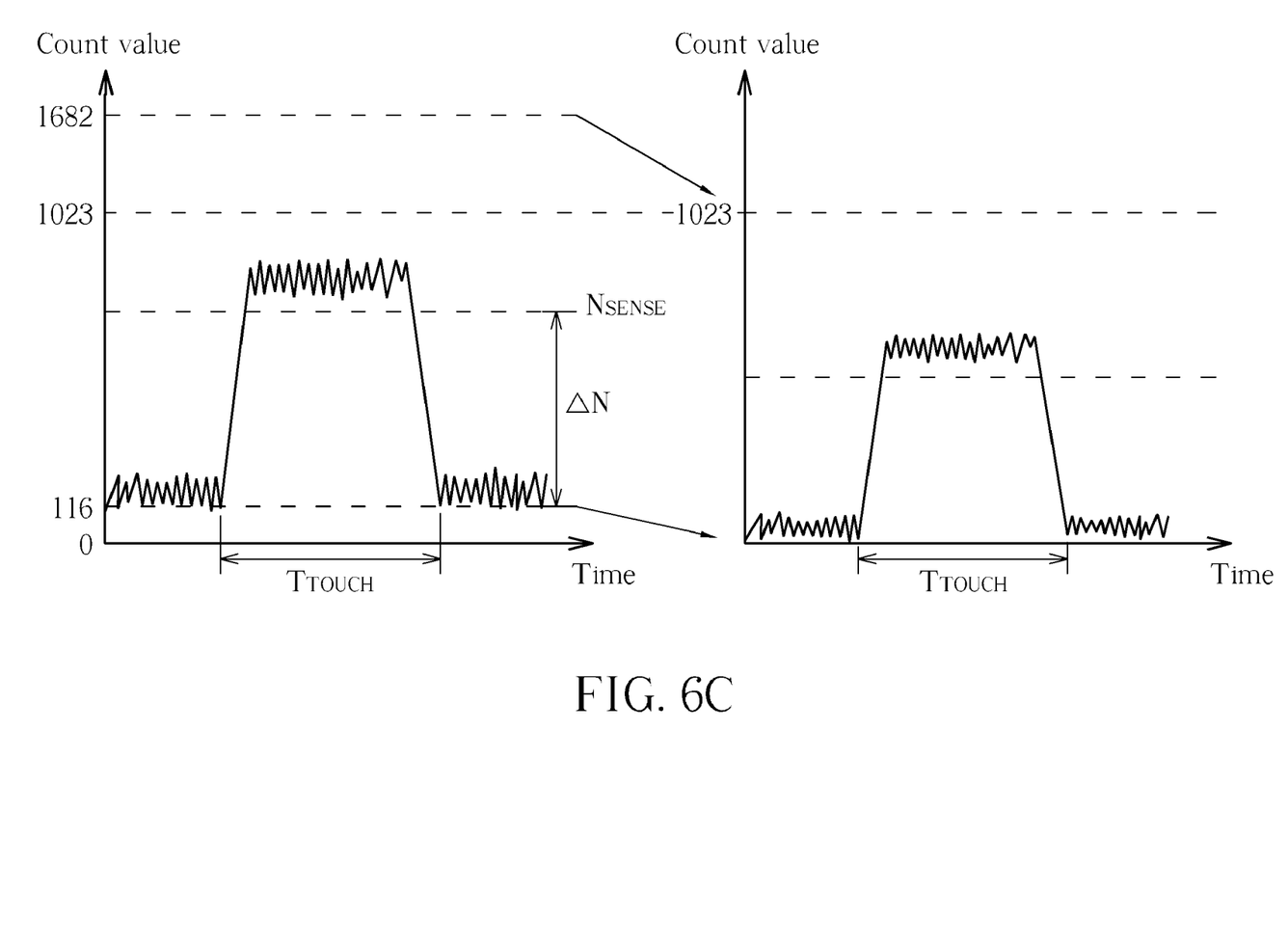

FIGS. 6A-6C are diagrams illustrating the operations of the self-calibration counters 500a and 500b according to the present invention. Assuming that the maximum count value $N_{MAX}$ is equal to 1023, the minimum count value $N_{MIN}$ is equal to 0, and $T_{TOUCH}$ represents the duration of a touch action. In the embodiment illustrated in FIG. 6A, the actual count value ΔN is within the predetermined capacitance-detecting range, and the range-adjusting circuit 450 thus controls the digital control current source 700 or the digital control oscillator 800 according to the current actual count value ΔN. In the embodiment illustrated in FIG. 6B, the range of the actual count value ΔN is 116-749, which means 0-155 and 750-1023 within the predetermined capacitance-detecting range can not be utilized. The range-adjusting circuit 450 thus enlarges the range of the original actual count value ΔN to 0-1023, thereby providing the optimized capacitance-detecting range. In the embodiment illustrated in FIG. 6C, the range of the actual count value ΔN is 0-1023, in which 1024-1682 is not included in the current predetermined capacitance-detecting range. The range-adjusting circuit 450 thus reduces the range of the original actual count value ΔN to 0-1023, thereby providing the optimized capacitance-detecting range.

Figure 7:
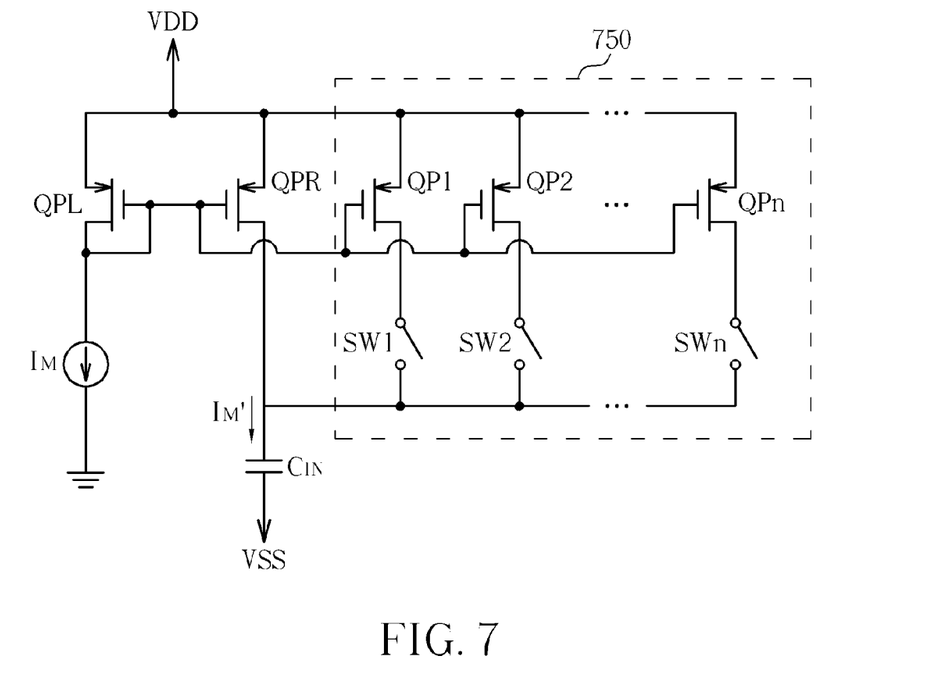
FIG. 7 is a diagram illustrating a digital control current source according to the present invention.

FIG. 7 is a diagram of the digital control current source 700 according to an embodiment of the present invention. The digital control current source 700 includes two transistor switches QPL and QPR, a capacitor $C_{IN}$, a reference current source $I_M$, and a current-adjusting circuit 750. $I_M$ and $I_M'$ respectively represent the conducting current of the transistor switches QPL and QPR, which may be P type metal-oxide-semiconductor (PMOS) transistor switches or other devices having similar function.

The current-adjusting circuit 750 may be implemented as a current mirror which includes a plurality of transistor switches QP1-QPn, each configured to provide a current whose value is a multiple of the conducting current $I_M$ of the transistor switches QPL and which is transmitted to the capacitor $C_{IN}$ via the switches SW1-SWn, respectively. In other words, a part of the conducting current $I_M'$ is supplied by the transistor switch QPR, while other parts of the conducting current $I_M'$ is the sum of the mirrored currents of the conducting current $I_M$ provided by transistor switches QP1-QPn. The transistor switches QP1-QPn may be PMOS transistor switches or other devices having similar function. The conducting current $I_M'$ increases with the number of the switches SW1-SWn which are turned on by the input-range calibrator 400. If the actual count value ΔN is smaller than the predetermined capacitance-detecting range, the present invention turns on fewer switches SW1-SWn in order to decrease the charging current $I_M'$. Since a longer capacitance charging time is required with smaller charging current $I_M'$, the counting time may be increased for enlarging the capacitance-detecting range. If the actual count value ΔN is larger than the predetermined capacitance-detecting range, the present invention turns on more switches SW1-SWn in order to increase the charging current $I_M'$. Since a shorter capacitance charging time is required with larger charging current $I_M'$, the counting time may be decreased for reducing the capacitance-detecting range.

In conclusion, if the current capacitance-detecting range can not be effectively utilized when the capacitance input range varies with humidity, temperature, operational environment, process or device aging, the present invention updates the capacitance-detecting range according to the variation in the input capacitance. The updated capacitance-detecting range may thus be maintained in the linear region of the circuit in order to provide accurate capacitance measurement.

Those skilled in the art will readily observe that numerous modifications and alterations of the device and method may be made while retaining the teachings of the invention.

What is claimed is:

1. A capacitance sensing circuit, comprising: an analog capacitance-detecting circuit configured to detect a touch capacitance of a touch panel when a touch action occurs according to a charging current and convert a detected value of the touch capacitance into a pulse width modulation (PWM) control signal; a PWM-to-digital circuit configured to convert the PWM control signal into a sensing count value according to a clock signal; and a self-calibration counter configured to adjust the charging current or the clock signal according to a difference between the sensing count value and a predetermined detecting range, thereby adjusting the predetermined detecting range for matching a range of the sensing count value; wherein the analog capacitance-detecting circuit comprises: a first switch controlled by the PWM control signal and including: a first end for receiving the charging current; a second end; and a control end for receiving the PWM control signal; a second switch controlled by a first control signal and including: a first end coupled to the second end of the first switch; a second end coupled to the panel for providing a ramp voltage corresponding to the touch capacitance; and a control end for receiving the first control signal;

a third switch controlled by a second control signal and including: a first end coupled to the second end of the second switch; a second end coupled to a negative bias voltage; and a control end for receiving the second control signal, wherein the first control signal and the second control signal have opposite phases; and a comparator configured to generate the PWM control signal according to the ramp voltage and a reference voltage, the comparator including: a first input end for receiving the reference signal; a second input end coupled to the first end of the second switch; and an output end coupled to the control end of the first switch for providing the PWM control signal.

2. The capacitance sensing circuit of claim 1, wherein the self-calibration counter comprises:
an input-range calibrator configured to generate a range conversion ratio according to a difference between the sensing count value and the predetermined detecting range; and
a digital current source configured to generate the charging current and adjust the charging current according to the range conversion ratio.

3. The capacitance sensing circuit of claim 2, wherein the input-range calibrator comprises:
a subtractor configured to provide an actual count value by subtracting the sensing count value by a baseline count value associated with a stray capacitance of the panel;
a maximum value register configured to store a maximum count value corresponding to an upper limit of the predetermined detecting range;
a minimum value register configured to store a minimum count value corresponding to a lower limit of the predetermined detecting range;
a comparator configured to determine a difference between a range of the sensing count value and the predetermined detecting range by comparing the actual count value with the maximum count value and the minimum count value; and
a range-adjusting circuit configured to:
control the digital control current source according to the range conversion ratio in order to increase the charging current when the range of the sensing count value exceeds the predetermined detecting range; or
control the digital control current source according to the range conversion ratio in order to reduce the charging current when the range of the sensing count value does not exceed the predetermined detecting range.

4. The capacitance sensing circuit of claim 3, wherein the input-range calibrator further comprises:
a counter configured to adjust a duty cycle of the range-adjusting circuit.

5. The capacitance sensing circuit of claim 3, wherein the PWM-to-digital circuit comprises:
a phase-adjusting unit configured to generate the clock signal; and
an adder configured to receive the PWM control signal from the analog capacitance-detecting circuit and the clock signal from the phase-adjusting unit, detect a value of the PWM control signal when triggered by the clock signal, and increase the sensing count value when the PWN control signal is at a predetermined level.

6. The capacitance sensing circuit of claim 1, wherein the PWM-to-digital circuit comprises:
an adder configured to receive the PWM control signal from the analog capacitance-detecting circuit and the clock signal from the self-calibration circuit, detect a value of the PWM control signal when triggered by the clock signal, and increase the sensing count value when the PWN control signal is at a predetermined level.

7. The capacitance sensing circuit of claim 1, wherein the self-calibration counter comprises:
an input-range calibrator configured to generate a range conversion ratio according to a difference between the sensing count value and the predetermined detecting range; and
a digital control oscillator configured to generate the clock signal and adjust a frequency of the clock signal according to the range conversion ratio.

8. The capacitance sensing circuit of claim 7, wherein the input-range calibrator comprises:
a subtractor configured to provide an actual count value by subtracting the sensing count value by a baseline count value associated with a stray capacitance of the panel;
a maximum value register configured to store a maximum count value corresponding to an upper limit of the predetermined detecting range;
a minimum value register configured to store a minimum count value corresponding to a lower limit of the predetermined detecting range;
a comparator configured to determine a difference between a range of the sensing count value and the predetermined detecting range by comparing the actual count value with the maximum count value and the minimum count value; and
a range-adjusting circuit configured to:
control the digital control oscillator according to the range conversion ratio in order to reduce the frequency of the clock signal when the range of the sensing count value exceeds the predetermined detecting range; or
control the digital control oscillator according to the range conversion ratio in order to increase the frequency of the clock signal when the range of the sensing count value does not exceed the predetermined detecting range.

9. The capacitance sensing circuit of claim 8, wherein the input-range calibrator further comprises:
a counter configured to adjust a duty cycle of the range-adjusting circuit.

* * * * *